Figure 1:
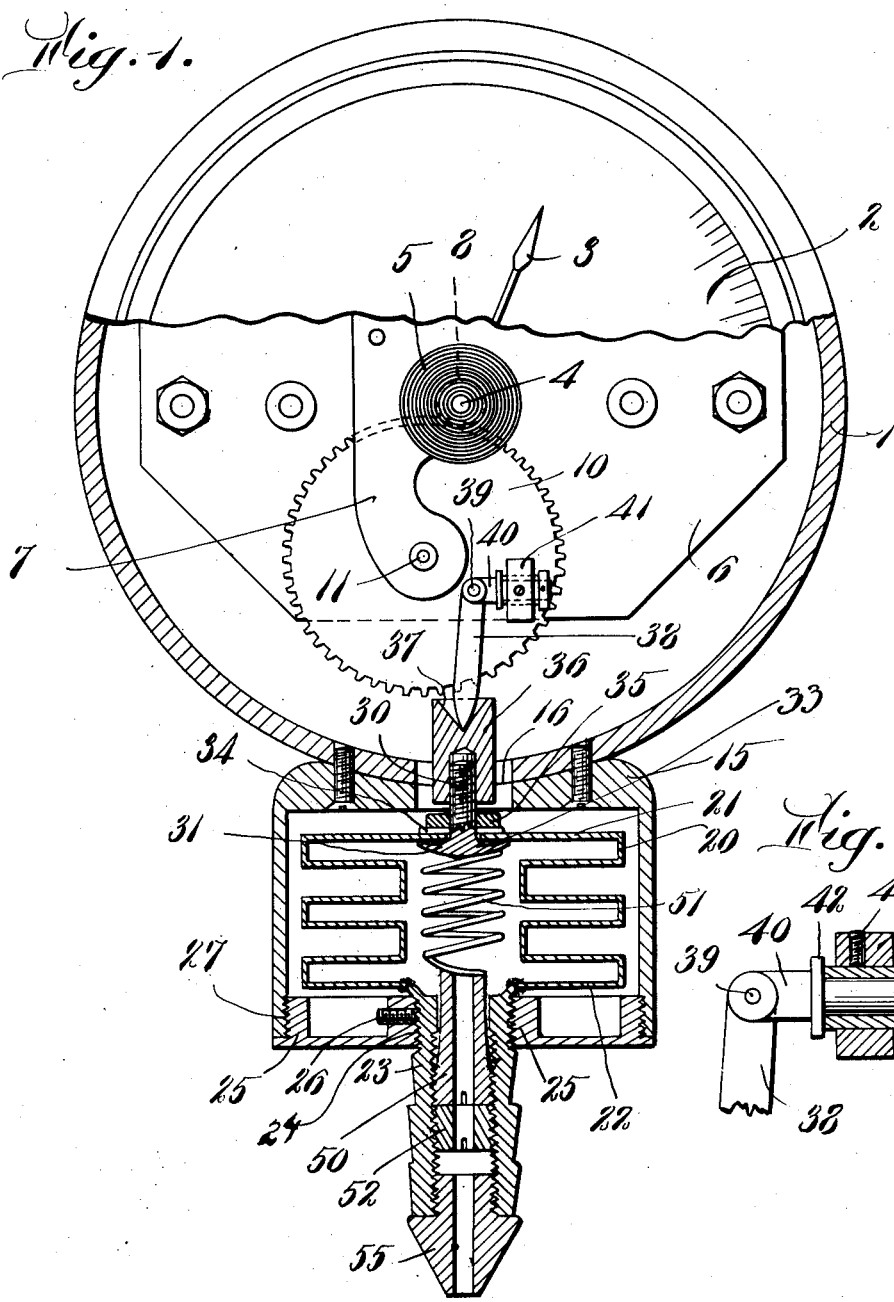

J. A. GREEN.
PRESSURE INDICATOR.
APPLICATION FILED FEB. 25, 1919.

1,338,436.

Patented Apr. 27, 1920.

Inventor
Joseph A. Green
by James R. Hodder
atty.

UNITED STATES PATENT OFFICE.

JOSEPH A. GREEN, OF PROVIDENCE, RHODE ISLAND.

PRESSURE-INDICATOR.

1,338,436. Specification of Letters Patent. Patented Apr. 27, 1920.

Application filed February 25, 1919. Serial No. 279,082.

*To all whom it may concern:*

Be it known that I, JOSEPH A. GREEN, a citizen of the United States, and a resident of Providence, Rhode Island, whose post-office address is No. 393 Harris avenue, Providence, Rhode Island, have invented an Improvement in Pressure - Indicators, of which the following description, in connection with the accompanying drawings, is a specification, like letters on the drawings representing like parts.

My present invention is a pressure indicator of the type known as sphygmomanometers which are extremely sensitive instruments and especially adapted for the purpose of testing blood pressure for medical work.

An important object of the invention is to provide improved means to facilitate the assembling and adjustment of this type of indicators and also to have the same capable of correct adjustment relatively with the dial, so that the indicator will register at zero. Heretofore, it has been customary, in assembling a delicate pressure mechanism, as herein described, to vary the position of the dial with the indicator and in fact specially graduated dials have frequently been necessary. By the present invention, I am enabled to utilize a standard dial and to accurately adjust the diaphragm and other operating parts of the mechanism to a correct reading or registration with the dial. As the moving parts of an apparatus of this type are extremely small, delicate and fragile, the assembling and adjustment is a matter of the greatest importance, both in the manufacturing expense and also in the subsequent use of a sphygmomanometer. I therefore provide adjustable devices and preferably a plurality of adjustable elements enabling the apparatus and dial to be set relatively with each other in order to correspond and register. A most important feature of the present invention consists in the novel arrangement of means whereby the diaphragm is maintained under a constant tension, and preferably this tension is adjustable and therefore one of the means for adjusting the moving parts of the pressure indicator to register with the dial. This feature of having a tension on the diaphragm and preferably an adjustable spring tension, renders the actuation of the diaphragm more perfect, more uniform, and also more accurate, preventing uneven variations. I believe that this feature of having a diaphragm under spring tension is a distinct novelty and as this is of importance, both in the operation of the gage and in the adjustment of the same during assembling, I desire to claim the same broadly.

A further feature of the present invention consists in the provision of automatic means to prevent any binding, undue strain, friction, or the like, during the operation of the moving parts connecting the diaphragm with the indicator and particularly to allow for adjustment of these connections during assembling. To this end I provide an adjustable friction nut on the diaphragm and I also provide a special type of adjustable and rotatable device on the gear actuating the indicator, which rotatable device is connected with the friction nut in a manner to transmit the variations in the diaphragm to the gear without binding or any undue tension.

Further features of the present invention consisting in novel combination of parts, improved details of construction and advantages will be hereinafter more fully pointed out and claimed.

Referring to the drawings illustrating a preferred embodiment of the invention—

Figure 2:
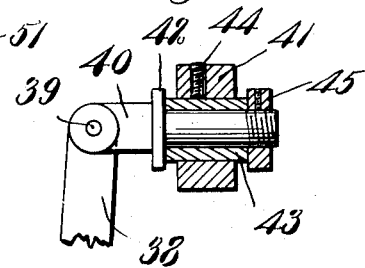

Figure 1 is a view of my improved pressure gage, partly shown in cross section; and Fig. 2 is an enlarged cross sectional view of the adjustable and swiveling construction on the actuating gear.

While pressure indicators embodying the invention may be of any desirable size, strength, tension, and capability, my invention is particularly intended for a sphygmomanometer or other low pressure gage and therefore is of relatively small size and extremely delicate in operation, being in fact, smaller than the attached drawings and approximately an inch and a half in diameter, compactness being of great importance.

The indicator 1 may be of usual type in which a dial 2 is fitted to coöperate with a hand 3 mounted upon a shaft 4, which shaft is impelled in one direction by a coiled hair spring 5. A bottom plate 6 and top plate 7, suitably secured to the casing 1, constitute bearings for the shaft 4, which carries a pinion, shown in dotted lines at 8, in mesh with an actuating gear 10—pivoted at 11 in suitable bearings in the plates 6 and 7. Attached to the indicator 1 is a diaphragm casing 15, a suitable recess or passage 16 extending from the interior of the casing 15 to the interior of the indicator 1 being provided. The diaphragm, designated generally at 20, comprises a series of disks, preferably of phosphor bronze or other suitable material, such disks being herein illustrated between the top disk 21 and bottom disk 22, the latter being secured to the hollow sleeve 23, by soldering or in any other suitable manner. This sleeve is externally threaded as shown at 24, to receive the base of cover 25. This cover is threaded onto the stem 23 and is rigidly secured in desired position by a set screw 26. I prefer to form this cover also threaded externally to coöperate with the correspondingly threaded rim of the casing 15, as shown at 27, so that with the sleeve 23 secured to the cover and diaphragm, both may be fitted within the casing 15 by this threaded union between the cover and casing. The top disk 21 is perforated to receive a headed stem 30, the head 31 being preferably cup-shaped slightly to present a rim-like contact, as indicated at 33 with the inner surface of the disk 21. The stem 30 is threaded and receives on the outside of the disk, a washer 34 and threaded nut 35. This construction enables me to form an air tight union between the head of the stem 30 and the top disk 21 without soldering, welding, or other methods of construction. In extremely delicate instruments of this type, this constructional feature is of particular importance and simplifies the assembling and therefore the expense of manufacture. The recess 16 between the casing 15 and the indicator 1 is of greater diameter than that of the stem 30 and is sufficient to receive, freely, an adjustable friction nut 36 threaded onto the stem 30 and having in its upper face a cup-shaped bearing 37 adapted to receive the conical end of a link 38. This link is pivotally secured at 39 to a rod 40, said rod being adjustably and rotatably held to a block 41, rigidly attached to the gear 10. I prefer to form the rod 40 with a shoulder 42 adapted to bear against the edge of the sleeve or bushing 43, which is slidable through a recess in the block 41 and may be held in adjusted position by a set screw 44. The end of the rod 40 carries a washer collar 45 secured thereto by a set screw, just in contact with the edge of the bushing 43 so as to permit a rotative movement of the rod 40 within the bushing, while also permitting adjustment of both rod and bushing forwardly and backwardly in the block 41. This construction provides a double adjustment in the connecting members between the diaphragm and the actuating gear 10 allowing for positioning the pivot 39 at any desired point radially from the center 11 of the gear 10 and also by adjustment of the friction nut 36.

The construction thus far described is operable and the feature of having the member 40 both adjustable and swiveling preventing any binding or undue friction in the transmission of movement from the diaphragm to the gear 10 is of very great importance in as delicate a device as that in this type of indicator. The movement necessarily shifts the angle of the transmission of power through the link 38 as the block 41 is rigid on the gear 10 and rotates with the latter.

The important feature of having the diaphragm under a spring tension will now be described. Threaded through the sleeve 23 is a hollow shaft 50 having secured at its inner rim the end of the spiral spring 51, the other end of said spring being adapted to bear upon the head 31 at the under side of the top disk 21. Rotation of this shaft 50 therefore serves to compress the spring 51, after it has contacted with the head 31, to a desired degree of tension, thus simultaneously putting the entire diaphragm under a preliminary tension and also constituting an adjustment to locate the hand 3 at zero on the dial 2, a slight increase or decrease on the spring 51 through manipulation of the shaft 50 thus accomplishing both these features. This is of considerable value in practice since the adjustments of the rod 40 and the friction nut 36 give a preliminary capability of adjustment during the assembling of the pressure gage and the further manipulation of the threaded shaft 50, thus serves as a finer and final adjustment of the hand 3 while placing the diaphragm under the tension. In order to hold and lock the shaft 50 into position where thus adjusted, I provide a threaded locking nut 52 and in order to still further complete the apparatus and to prevent disarrangement of either the locking nut 52 or shaft 50, I provide a threaded cap 55 to guard the same and to which the rubber tube to the pump and band may be attached.

The operation of my improved indicator will be readily understood. The various delicate parts, connections, and mechanisms can be easily adjusted and quickly assembled. With the diaphragm 20 subject to the tension of the spring 51 at the beginning and during any indicating operation, the movement of the diaphragm is steadied and rendered more uniform and more delicate, the inherent resiliency of the diaphragm being thus guided and controlled. With the two springs 5 and 51 also actuating in opposition to each other, a more steady and accurate holding of the hand 3 and consequently an easier and quicker reading of the indicator results with greater freedom from error. The swiveling operation of the rod 40 eliminates any danger of binding in the connections from the diaphragm to the gear 10 and thereby still further renders the instrument accurate during a large range of pressures and irrespective of the relative position of the block 41 on the gear 10, as it is swung upwardly or downwardly. It will be appreciated therefore that I have provided a novel and efficient indicator, with a most accurate capability for adjustment in assembling and in operation, enabling a standard dial to be used and with the zero always positioned at the same place and also, with the two springs acting against each other, a steadying means for the hand during the operation of the apparatus.

My present invention is further described and defined in the form of claims as follows:

1. In a pressure indicator of the kind described, a dial, an indicating hand arranged for rotative movement over said dial, a diaphragm adapted to receive variations in fluid pressure and means to transmit the variations in movement in said diaphragm to the indicating hand, comprising a gear wheel carrying a fixed block, a sleeve slidable within said block, a rod adapted to swivel within said sleeve and a movable link from said rod to a member carried by the diaphragm.

2. A pressure gage of the kind described having in combination a diaphragm, an indicating hand and means to move the hand in unison with the movements of said diaphragm consisting in a pivotal mounting for the hand, a gear to rotate said hand, a block on said gear and a universal joint connection from the block to the diaphragm whereby the movement transmitted by the diaphragm to the gear will be free of any binding action in any direction.

3. In a pressure gage of the kind described, a diaphragm, an indicating hand, connections from the diaphragm to the indicating hand, whereby movement of the former will be communicated to the latter, including a cup-shaped member adjustably secured to a threaded stem rigid with the diaphragm, said member having friction engagement with said stem to hold the same wherever adjusted.

4. A disk diaphragm of the kind described having in combination a base having an interiorly threaded bore, a threaded shaft adapted to rotate within said bore, a spring carried by the shaft and arranged to exert yielding tension on the top disk of the diaphragm and means to lock said spring and member into finally adjusted position.

In testimony whereof I have signed my name to this specification in the presence of two subscribing witnesses.

JOSEPH A. GREEN.

Witnesses:
JAMES R. HODDER,
RACHAEL L. CLARK.